(12) United States Patent
Cheng

(10) Patent No.: US 7,224,937 B2
(45) Date of Patent: May 29, 2007

(54) MOBILE STATION APPARATUS CAPABLE OF CHANGING ACCESS CONTROL CLASSES DUE TO LOW BATTERY CONDITION FOR POWER SAVING AND METHOD OF THE SAME

(75) Inventor: Steven D. Cheng, San Diego, CA (US)

(73) Assignee: BENQ Corporation, Taoyuan (TW)

( * ) Notice: Subject to any disclaimer, the term of this patent is extended or adjusted under 35 U.S.C. 154(b) by 347 days.

(21) Appl. No.: 10/893,766

(22) Filed: Jul. 16, 2004

(65) Prior Publication Data

US 2006/0014516 A1    Jan. 19, 2006

(51) Int. Cl.
*H04B 1/16* (2006.01)
*H04B 7/00* (2006.01)

(52) U.S. Cl. ............ 455/39; 455/343.5; 455/522

(58) Field of Classification Search .......... 455/404.1, 455/404.2, 434, 525, 515, 517, 572, 574, 455/343.1, 343.5, 343.2, 69, 522, 127.1
See application file for complete search history.

(56) References Cited

U.S. PATENT DOCUMENTS

| | | | | |
|---|---|---|---|---|
| 5,392,462 | A * | 2/1995 | Komaki | 455/552.1 |
| 5,799,256 | A * | 8/1998 | Pombo et al. | 455/574 |
| 6,263,200 | B1 * | 7/2001 | Fujimoto | 455/343.5 |
| 6,275,712 | B1 * | 8/2001 | Gray et al. | 455/522 |
| 6,377,798 | B1 * | 4/2002 | Shaffer et al. | 455/426.1 |
| 6,408,172 | B1 * | 6/2002 | Alperovich et al. | 455/404.1 |
| 6,459,896 | B1 * | 10/2002 | Liebenow | 455/425 |
| 6,624,636 | B2 | 9/2003 | Arai et al. | 324/426 |
| 6,630,814 | B2 | 10/2003 | Ptasinski et al. | 320/132 |
| 6,748,246 | B1 * | 6/2004 | Khullar | 455/574 |
| 2002/0016189 | A1 * | 2/2002 | Sheynblat et al. | 455/574 |
| 2003/0040298 | A1 * | 2/2003 | Heatley | 455/411 |
| 2005/0101287 | A1 * | 5/2005 | Jin et al. | 455/404.1 |
| 2005/0198257 | A1 * | 9/2005 | Gupta et al. | 709/224 |

* cited by examiner

*Primary Examiner*—Simon Nguyen
(74) *Attorney, Agent, or Firm*—Birch, Stewart, Kolasch & Birch, LLP

(57) ABSTRACT

The invention relates to a mobile station apparatus in a communication system. The communication system comprises a plurality of base stations for providing mobile communication service within a covered communication area. The mobile station apparatus comprises a memory for recording a predetermined access control class and determining which base station the mobile station apparatus is allowed to camp on for conducting mobile communication service, a battery for providing electrical power, a control program, and a power detector for detecting the current power of the battery, so that when the power detector detects that the power is lower than a predetermined low power watermark, the power detector issues a trigger signal. When the control program receives the trigger signal, the control program overwrites the predetermined access control class, so as to allow the mobile station apparatus to conduct mobile communication service through other base stations in the communication area.

20 Claims, 7 Drawing Sheets

MOBILE STATION APPARATUS CAPABLE OF CHANGING ACCESS CONTROL CLASSES DUE TO LOW BATTERY CONDITION FOR POWER SAVING AND METHOD OF THE SAME

BACKGROUND OF THE INVENTION

1. Field of the Invention

This present invention relates to a mobile station apparatus applied in a communication system, especially relating to the mobile station apparatus, which is able to change the access control class according to the status of low battery power for power saving.

2. Description of the Prior Art

Mobile station apparatuses, such as mobile phones, provide convenient mobile communication to users; however, mobile phones can be used to communicate only if batteries can provide enough electrical power. When electrical power is low, a conventional mobile phone sends out an alert sound or signal to remind users to change or re-charge batteries. If one user is using a mobile phone, and the electrical power is low, the user might worry that communication will be interrupted at any time; otherwise, the user need to change the battery right away, and that causes inconvenience to the user.

Conventional mobile station apparatus records a predetermined access control class for determining, under a normal condition, which base station should be used to conduct the mobile communication service. Under the normal condition, the mobile station apparatus is only allowed to camp on, for conducting the mobile communication service, through a limited predetermined number of, not all, base stations in the communication area. The mobile station apparatus is able to receive the received signal strength indicator (RSSI) issued by the base stations. Usually, the stronger the RSSI of a base station for conducting the mobile communication service, the less electrical power the mobile station apparatus consumes.

Therefore, the objective of the present invention is to provide a mobile station apparatus and method, which is able to change the access control class under the condition of low battery power, so as to allow the mobile station apparatus to conduct mobile communication service through base stations that consumes less electrical power, thus preventing the worries of users about communication interruption, or the inconvenience of changing batteries right away.

SUMMARY OF THE INVENTION

The objective of the present invention is to provide a mobile station apparatus and method; this mobile station apparatus and method is able to change the access control class according to the status of low battery power and find out the most suitable base station to conduct the mobile communication service, so as to save power and further extend the time of communication service.

The mobile station apparatus of the present invention is applied in a communication system. The communication system comprises a plurality of base stations for providing mobile communication service within a covered communication area. The mobile station apparatus comprises a memory, a battery, a power detector, and a control program.

The memory is used for recording a predetermined access control class, so as to determine, under a normal condition, which base station in the communication area the mobile station apparatus is allowed to camp on for conducting mobile communication service. The battery is used for providing electrical power to the mobile station apparatus. The power detector is used for detecting the current power of the battery; when the power detector detects that the power provided by the battery is lower than a predetermined low power watermark, the power detector issues a trigger signal.

When the control program receives the trigger signal issued by the power detector, the control program overwrites the predetermined access control class recorded in the memory, so as to allow the mobile station apparatus to conduct the mobile communication service through other base stations in the communication area.

In the mobile station apparatus of the present invention, when the power provided by the battery is lower than a predetermined low power watermark, the control program overwrites the predetermined access control class recorded in the memory, so as to allow the mobile station apparatus to conduct the mobile communication service through other base stations in the communication area. By this way, the mobile station apparatus conducts the mobile communication service through other more suitable base stations; therefore, the consumed electrical power is minimized. By using the most suitable base station to communicate, the communication quality is better, and less power is consumed by the mobile station apparatus; therefore, the present invention can extend the time of communication service.

The advantage and spirit of the invention may be understood by the following recitations together with the appended drawings.

BRIEF DESCRIPTION OF THE APPENDED DRAWINGS

DETAILED DESCRIPTION OF THE INVENTION

The mobile station apparatus is applied in a communication system. The communication system comprises a plurality of base stations for providing mobile communication service within a covered communication area. The present invention is suitable for conventional mobile communication system, such as the code division multiple access (CDMA), global system for mobile communications (GSM) . . . etc.

Figure 1:
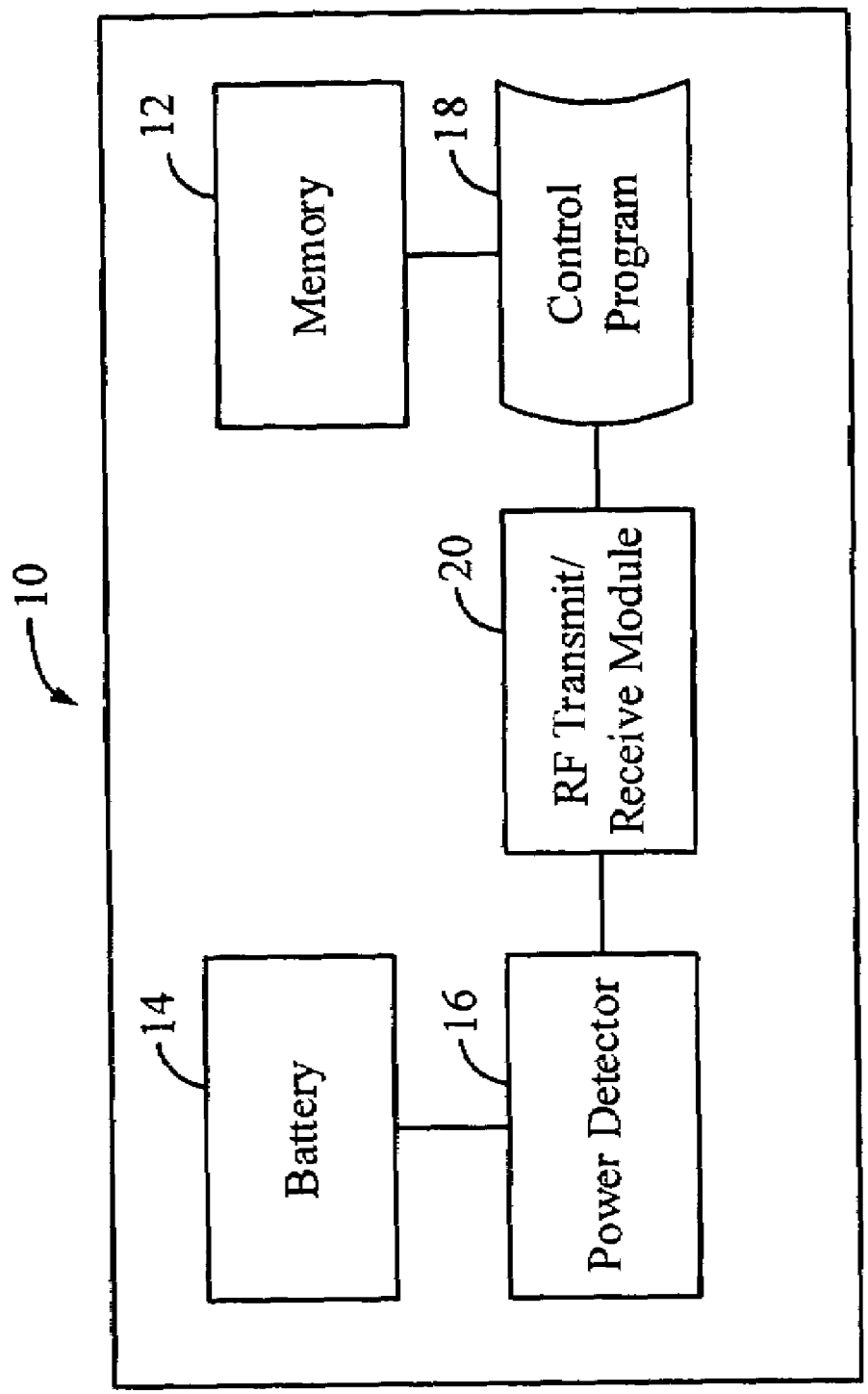
FIG. 1 is a system block diagram of the mobile station apparatus according to the present invention.

Referring to FIG. 1, FIG. 1 is a system block diagram of the mobile station apparatus 10 according to the present invention. The mobile station apparatus 10 comprises a memory 12, a battery 14, a power detector 16, a control program 18, and a RF transmit/receive module 20. The battery 14 is used for providing electrical power to the mobile station apparatus 10.

The memory 12 is used for recording a predetermined access control class, so as to determine, under a normal condition, which base station in the communication area the mobile station apparatus is allowed to camp on for conducting the mobile communication service.

The predetermined access control class recorded in the memory 12 permits the mobile station apparatus, under the normal condition, to conduct mobile communication service only through a predetermined limited number of, not all, base stations in the communication area. However, the normal condition does not include an emergency condition. When a user faces an emergency, the user can dial the emergency telephone number, and the mobile station apparatus can conduct mobile communication service through every base station in the communication area.

The power detector 16 is used for detecting the current power of the battery 14. When the power detector 16 detects that the power provided by the battery 14 is lower than a predetermined low power watermark, the power detector 16 issues a trigger signal.

When the control program 18 receives the trigger signal issued by the power detector 16, the control program 18 overwrites the predetermined access control class recorded in the memory 12, so as to allow the mobile station apparatus 10 to conduct mobile communication service through other base stations in the communication area.

The control program 18 can further generate a location information that represents the current location of the mobile station apparatus. When the control program 18 receives the trigger signal issued by the power detector, the control program 18 sends out an alert message and the location information to the communication system and requests to change the access control class of the mobile station apparatus 10.

When the mobile station apparatus 10 receives a change confirmation message replied from the communication system, the control program 18 upgrades the access control class of the mobile station apparatus 10, so as to enable the mobile station apparatus to select other base stations in the communication area to conduct mobile communication service through a base station select/re-select procedure. The mobile station apparatus 10 performs the base station select/re-select procedure approximately every 5 second.

The mobile station apparatus 10 further comprises a RF transmit/receive module 20 for transmitting and receiving the RF signal to/from the base stations. The RF transmit/receive module 20 is able to receive a received signal strength indicator (RSSI) issued by the base stations.

The base station select/re-select procedure transmits the location information of the current location of the mobile station apparatus 10 and the corresponding RSSI received from the base stations to the communication system. Then, the communication system finds out the most suitable base station according to the location information and the RSSIs, so as to minimize the consumed electrical power when the mobile station apparatus conducts mobile communication service through the found base station.

Because each access control class comprises many base stations, the mobile station apparatus selects the base station for performing the mobile communication through the base station select/re-select procedure. According to the current location and the corresponding RSSIs of the base stations, a base station, which has the strongest RSSI, can be selected from the many base stations. By using the base station, which has the strongest RSSI, to perform mobile communication, the communication quality is better, and less power is consumed by the mobile station apparatus; therefore, the present invention can extend the time of the communication service.

In one embodiment, the most suitable base station, found by the communication system according to the location information and the RSSIs, is the base station nearest to the mobile station apparatus 10. Usually, when there is no interference effect, the base station with the strongest RSSI is the base station nearest to the mobile station apparatus 10. By using the base station nearest to the mobile station apparatus 10 to communicate, less power is consumed by the mobile station apparatus, and the time of the communication service is further extended.

In one embodiment, after the control program 18 overwrites the predetermined access control class recorded in the memory 12, the mobile station apparatus 10 is allowed to temporarily conduct a one-time mobile communication service through other base stations in the communication area. When the mobile communication service is terminated, and when the battery is re-charged, the control program 18 restores the predetermined access control class that is originally recorded in the memory 12. That means, when the mobile communication is performed, if the electrical power is lower than a predetermined low power watermark, the mobile station apparatus 10 can automatically change the access control class and temporarily conducts a one-time mobile communication service through other base stations in the communication area; therefore, users do not have to worry that the communication will be terminated right away. Furthermore, if the users quickly finish the communication and re-charge or change the batteries, then the mobile station apparatus 10 can restore to the original predetermined access control class.

Figure 2:
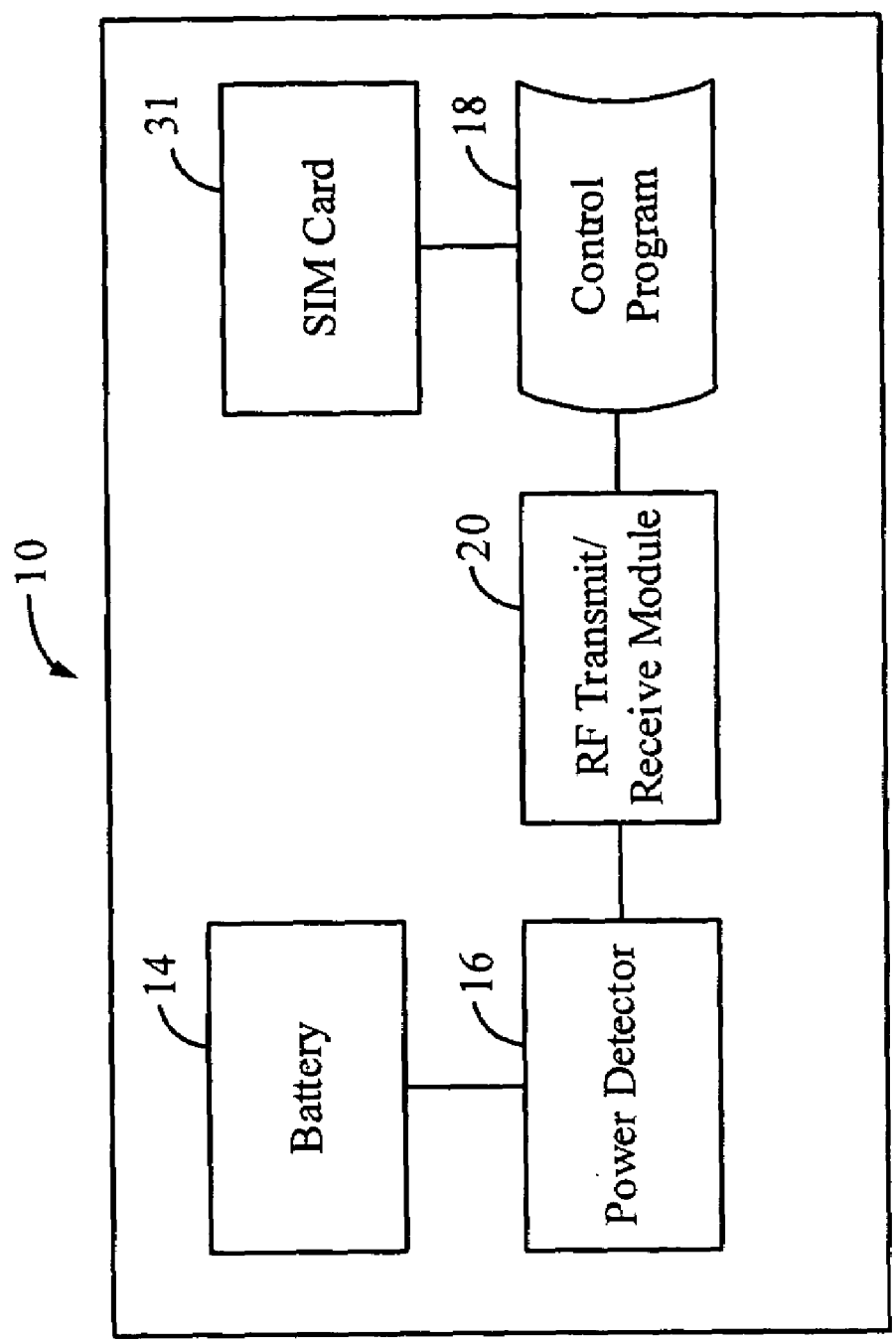
FIG. 2 is a system block diagram of the case when the application of the mobile station apparatus of the present invention is a mobile phone.
Figure 3:
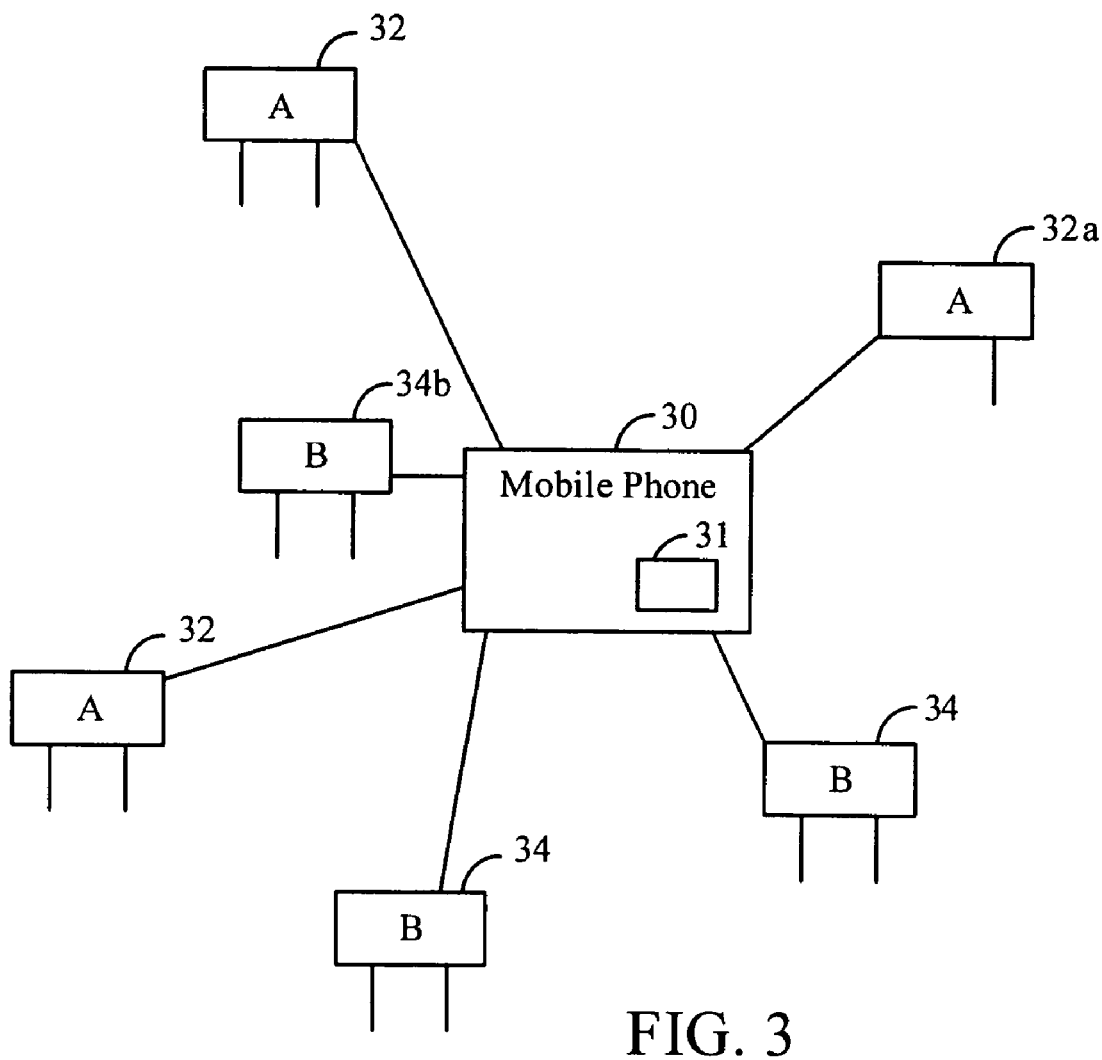
FIG. 3 is a schematic diagram of changing the access control class of the case when the application of the mobile station apparatus of the present invention is a mobile phone.

Referring to FIG. 2 and FIG. 3, FIG. 2 is a system block diagram of the case when the application of the mobile station apparatus of the present invention is a mobile phone 30; FIG. 3 is a schematic diagram of changing the access control class of the mobile phone 30 shown in FIG. 2. In one embodiment, the mobile station apparatus of the present invention is a mobile phone 30, and the memory is a subscriber identification module card (SIM card) 31 for recording a local access control class information of the mobile station apparatus in the communication area.

As shown in FIG. 3, the access control class recorded in the SIM card 31 of the mobile phone 30 is the original access control class (A). That means, under the normal condition, the mobile phone 30 is allowed to camp on the base station 32 of the access control class (A) in the communication area for conducting mobile communication service. The mobile phone 30 receives the RSSI from the base station 32 and performs the base station select/re-select procedure approximately every 5 seconds. In this embodiment, the mobile phone originally conducts the mobile communication service through the base station 32a.

When the power detector 16 detects that the power provided by the battery 14 is lower than a predetermined low power watermark, the power detector 16 issues the trigger signal. When the control program 18 receives the trigger signal issued by the power detector 16, the control program 18 generates the location information representing the current location of the mobile phone 30, and the control program 18 sends out an alert message and the location information to the communication system and requests to change the access control class of the mobile phone 30.

When the mobile phone 30 receives a change confirmation message replied from the communication system, the control program 18 upgrades the access control class of the mobile phone 30. The control program 18 overwrites the access control class (A) recorded in the SIM card 31 to the access control class (B), so as to enable the mobile phone 30 to conduct the mobile communication service through the base station 34 of the access control class (B) in the communication area.

By the base station select/re-select procedure, the location information of the current location of the mobile phone 30 and the corresponding RSSI received from the base station 34 of the access control class (B) are transmitted to the communication system, and the communication system finds the most suitable base station according to the location information and the RSSIs. In the embodiment shown in FIG. 3, because the base station 34b of the access control class (B) is the nearest base station to the current location of the mobile phone 31, without any interference effect, the most suitable base station is the base station 34b. Moreover, the consumed electrical power is minimized when the mobile phone 30 conducts the communication service through the base station 34b.

When the control program 18 overwrites the access control class (A) recorded in the SIM card 31 to the access control class (B), the mobile phone 30 is allowed to temporarily conduct a one-time mobile communication service through the base station (34b) of the access control class (B) in the communication area. When the mobile communication service is terminated, and when the battery 14 is re-charged, then the control program 18 restores the access control class originally recorded in the SIM card 31; that means the access control class (A) is restored.

Figure 4:
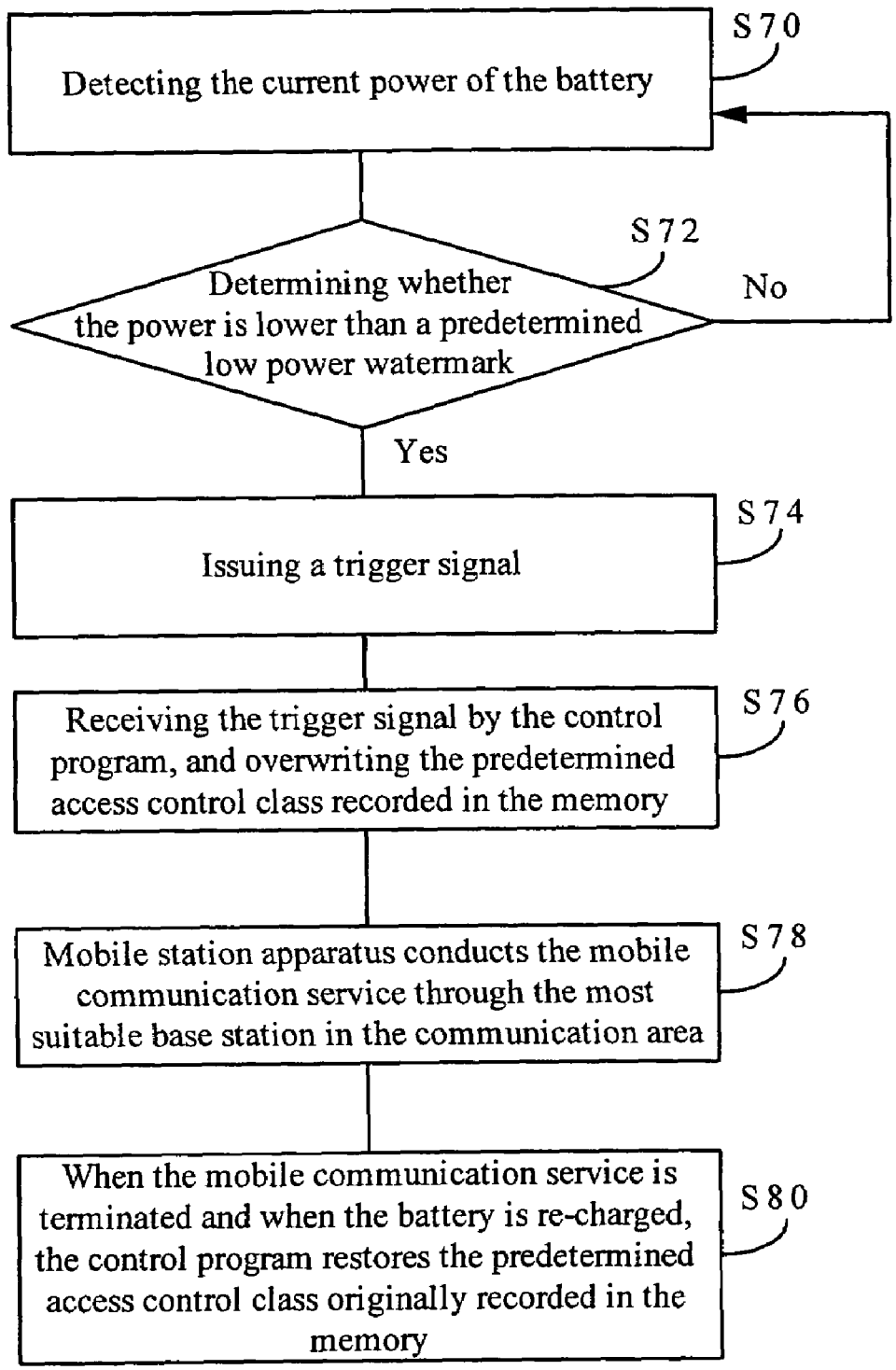
FIG. 4 is a flow chart of the method of changing the access control class in the mobile station apparatus according to the present invention.

Referring to FIG. 4, FIG. 4 is a flow chart of the method of changing the access control class in the mobile station apparatus 10 according to the present invention. The present invention also provides a method for changing the access control class in the mobile station apparatus. In the following paragraph, the mobile station apparatus 10 shown in FIG. 1 and the communication system thereof are taken as an example to describe the method of changing the access control class according to the present invention. The method of changing the access control class in the mobile station apparatus 10 of the present invention comprises the following steps:

Step S70: Detect the current power of the battery 14.

Step S72: Determine whether the power provided by the battery 14 is lower than a predetermined low power watermark. If yes, then perform step S74; if not, then perform step S70.

Step S74: Issue a trigger signal.

Step S76: When the control program 18 receives the trigger signal, the control program 18 overwrites the predetermined access control class recorded in the memory 12, so as to allow the mobile station apparatus 10 to conduct mobile communication service through a most suitable base station of another access control class in the communication area.

Step S78: The mobile station apparatus 10 conducts mobile communication service through the most suitable base stations.

Step S80: When mobile communication service is terminated, and when the battery is re-charged, then the control program 18 restores the predetermined access control class originally recorded in the memory 12.

Figure 5:
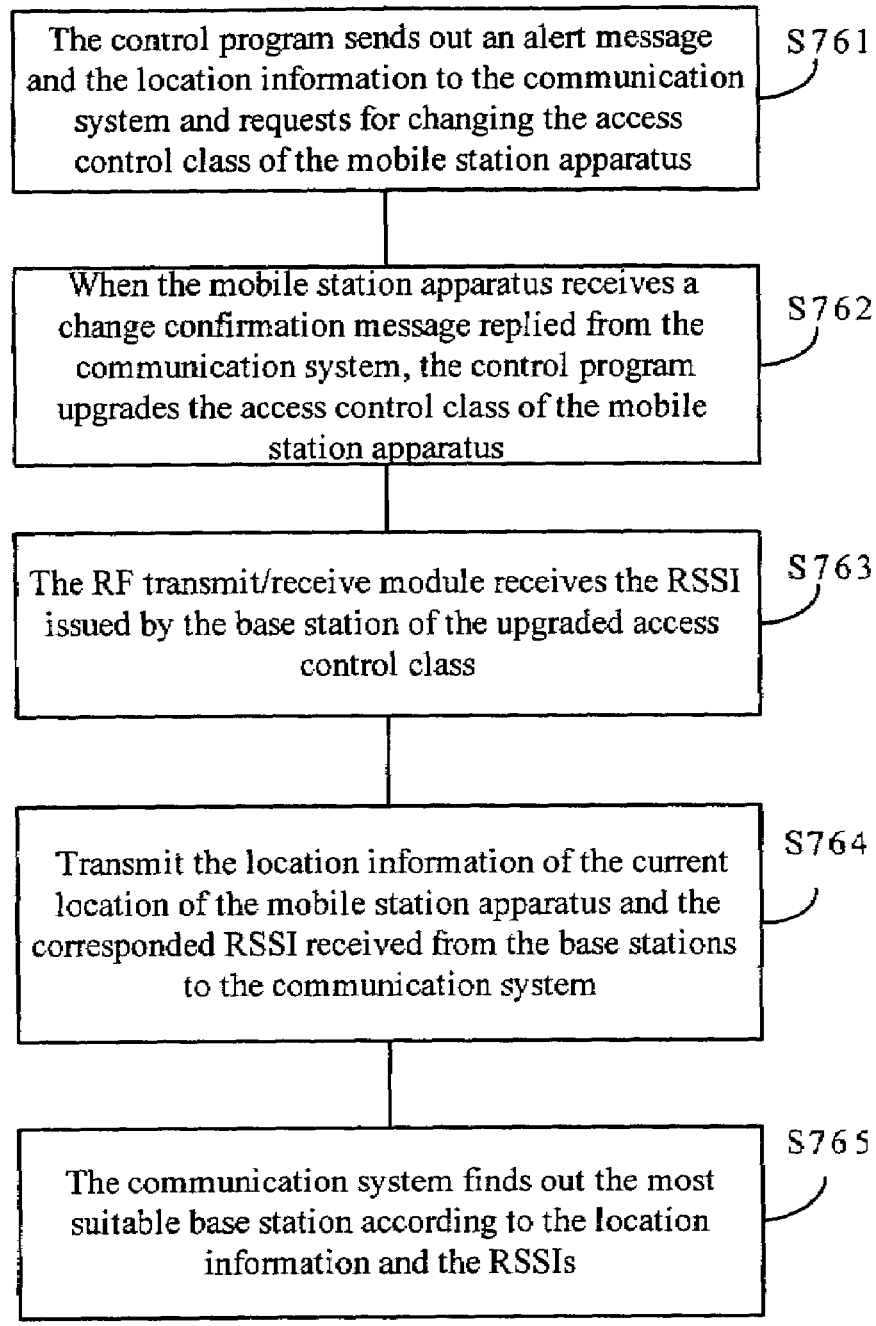
FIG. 5 is a flow chart of the overwriting method of changing the access control class in the mobile station apparatus according to the present invention.

Referring to FIG. 5, FIG. 5 is a flow chart of the overwriting method of changing the predetermined access control class recorded in the memory 12 in the mobile station apparatus according to the present invention. In step S76 shown in FIG. 5, the overwriting method of changing the predetermined access control class recorded in the memory 12 comprises the following steps:

Step S761: When the control program 18 receives the trigger signal, the control program 18 sends out an alert message and the location information to the communication system and requests for changing the access control class of the mobile station apparatus 10.

Step S762: When the mobile station apparatus 10 receives a change confirmation message replied from the communication system, the control program 18 upgrades the access control class of the mobile station apparatus.

Step S763: The RF transmit/receive module 20 receives the RSSI issued by the base station of the upgraded access control class.

Step S764: Transmit the location information of the current location of the mobile station apparatus 10 and the RSSI received from the base stations to the communication system.

Step S765: The communication system finds out the most suitable base station according to the location information and the RSSIs.

The above-mentioned steps (S761 to S765) are the steps of the mobile station apparatus 10 for finding the most suitable base stations by the base station select/re-select procedure after the access control class is upgraded.

The method of changing the access control class in the mobile station apparatus of the present invention enables the mobile station apparatus to change the access control class when the electrical power provided by the battery is lower than a predetermined low power watermark, so that the mobile station apparatus conducts mobile communication service through the base station which consumes less electrical power. Therefore, power is efficiently saved.

Figure 6:
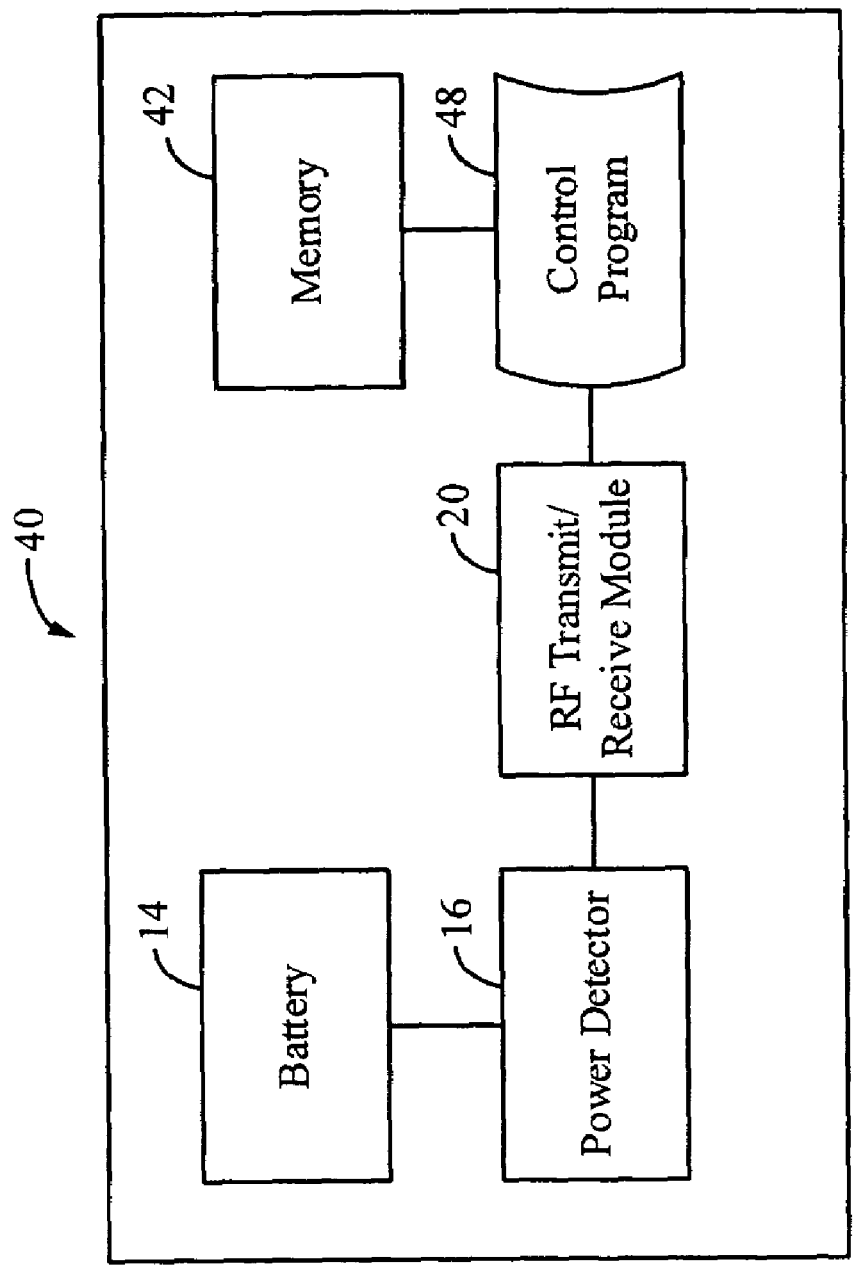
FIG. 6 is a system block diagram of another embodiment of the mobile station apparatus according to the present invention.

Referring to FIG. 6, FIG. 6 is a system block diagram of another embodiment of the mobile station apparatus 40 according to the present invention. The main difference between the mobile station apparatus 40 shown in FIG. 6 and the mobile station apparatus 10 shown in FIG. 1 is the related information of the access control class recorded in the memory. In the mobile station apparatus 40, the memory 42 directly records a first access control class and a second access control class in the communication areas. The number of available base stations corresponding to the first access control class is less than the number of available base stations corresponding to the second access control class. Under the normal condition, the mobile station apparatus 40 uses the first access control class in the communication system, so that the mobile station apparatus is allowed to conduct mobile communication service by camping on fewer base stations assigned by the first access control class.

When the mobile station apparatus 40 receives the trigger signal issued by the power detector 16, the mobile station apparatus 40 uses the second access control class in the communication system, so that the mobile station apparatus 40 is allowed to conduct mobile communication service by camping on more base stations assigned by the second access control class. Because the number of available base stations corresponding to the second access control class is more, the chance for finding the most suitable base stations is higher also; therefore, the consumed electrical power is minimized when the mobile station apparatus 40 conducts mobile communication service through the most suitable base station.

Figure 7:
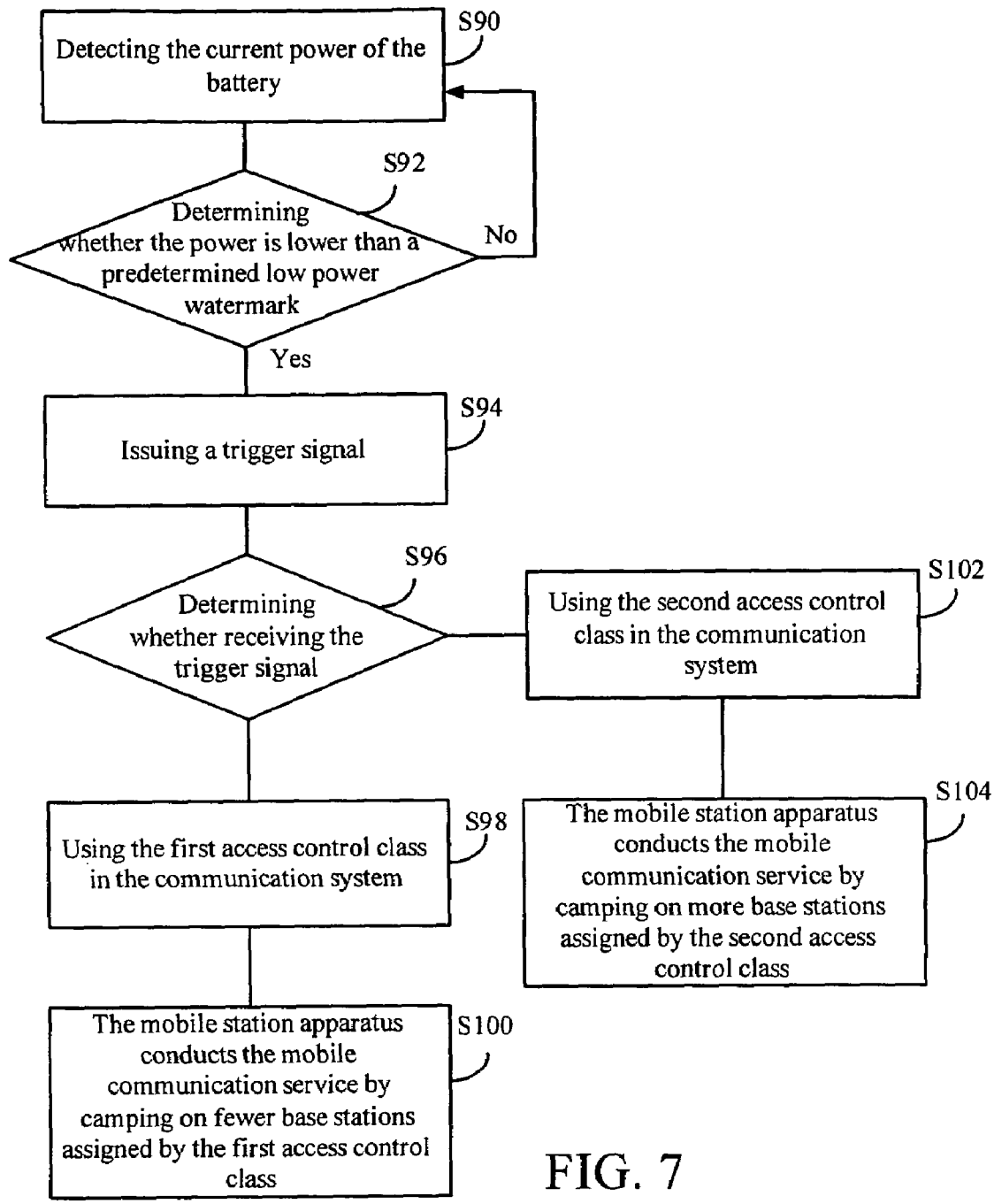
FIG. 7 is a flow chart of the method of changing the access control class in the mobile station apparatus according to another embodiment of the present invention.

Referring to FIG. 7, FIG. 7 is a flow chart of the method of changing the access control class in the mobile station apparatus 40 according to another embodiment of the present invention. The method of changing the access control class in the mobile station apparatus 40 of another embodiment of the present invention comprises the following steps:

Step S90: Detect the current power of the battery.

Step S92: Determine whether the power provided by the battery is lower than a predetermined low power watermark. If yes, then perform step S94; if not, then perform step S90.

Step S94: Issue a trigger signal.

Step S96: Determine whether the trigger signal is received; if not, then perform step S98; if yes, then perform step S102.

Step S98: Use the first access control class in the communication system.

Step S100: The mobile station apparatus is allowed to conduct mobile communication service, camping on fewer base stations assigned by the first access control class.

Step S102: Use the second access control class in the communication system.

Step S104: The mobile station apparatus is allowed to conduct mobile communication service by camping on more base stations assigned by the second access control class.

In the mobile station apparatus of the present invention, when the power provided by the battery is lower than a predetermined low power watermark, the mobile station apparatus requests the communication system to change the access control class, and when the mobile station apparatus receives the change confirmation message, the mobile station apparatus can change the access control class, so as to enable the mobile station apparatus to select other base stations in the communication area to conduct mobile communication service. By this way, the mobile station apparatus conducts mobile communication service through the most suitable base station; therefore, the consumed electrical power is minimized. By using the most suitable base station to communicate, the communication quality is better, and less power is consumed by the mobile station apparatus; therefore, the present invention can extend the time of the communication service.

Therefore, the mobile station apparatus, which is able to change the access control class according to the status of low battery power, and method thereof of the present invention enables users to change the access control class to select the nearest base station to conduct the mobile communication service when the power of the battery is lower than a certain condition. Because the base station is the nearest one, the consumed electrical power is minimized when communicating by the mobile station apparatus; therefore, the power of the battery can be saved, and the available communication time with the remaining power can be extended.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A mobile station apparatus in a communication system, the communication system comprising a plurality of base stations for providing mobile communication service within a covered communication area, the mobile station apparatus comprising:

a memory for recording a predetermined access control class, so as to determine, under a normal condition, which base stations in the communication area the mobile station apparatus is allowed to camp on for conducting the mobile communication service;

a battery for providing electrical power to the mobile station apparatus;

a power detector for detecting the current power of the battery, when the power detector detects that the power provided by the battery is lower than a predetermined low power watermark, the power detector issuing a trigger signal; and a control program, wherein when the control program receives the trigger signal issued by the power detector, the control program overwrites the predetermined access control class recorded in the memory, so as to allow the mobile station apparatus to conduct the mobile communication service through other base stations in the communication area.

2. The mobile station apparatus of claim 1, wherein the memory is a subscriber identification module card (SIM card) for recording a local access control class information of the mobile station apparatus in the communication area.

3. The mobile station apparatus of claim 1, wherein the normal condition does not comprise an emergency condition.

4. The mobile station apparatus of claim 1, wherein the predetermined access control class recorded in the memory permits the mobile station apparatus, under the normal condition, only to conduct the mobile communication service through a predetermined limited number of, not all, base stations in the communication area.

5. The mobile station apparatus of claim 1, wherein the control program further generates a location information representing the current location of the mobile station apparatus, and when the control program receives the trigger signal issued by the power detector, the control program sends out an alert message and the location information to the communication system and requests for changing the access control class of the mobile station apparatus; and wherein when the mobile station apparatus receives a change confirmation message replied from the communication system, the control program upgrades the access control class of the mobile station apparatus, so as to enable the mobile station apparatus to select other base stations in the communication area to conduct the mobile communication service through a base station select/re-select procedure.

6. The mobile station apparatus of claim 5, wherein the mobile station apparatus further comprises a RF transmit/receive module for transmitting and receiving the RF signal to/from the base stations, and the RF transmit/receive module receives a received signal strength indicator (RSSI) issued by the base stations.

7. The mobile station apparatus of claim 6, wherein the base station select/re-select procedure transmits the location information of the current location of the mobile station apparatus and the corresponded RSSI received from the base stations to the communication system, and then the communication system finds out the most suitable base station according to the location information and the RSSIs, so as to minimize the consumed electrical power when the mobile station apparatus conducts the mobile communication service through the found base station.

8. The mobile station apparatus of claim 7, wherein the most suitable base station is the base station nearest to the current location of the mobile station apparatus.

9. The mobile station apparatus of claim 5, wherein the mobile station apparatus performs the base station select/re-select procedure approximately every 5 second.

10. The mobile station apparatus of claim 1, wherein, after the control program overwrites the predetermined access control class recorded in the memory, the mobile station apparatus is allowed to temporarily conduct the mobile communication service through other base station in the communication area for one time, and when the mobile communication service is terminated and when the battery is re-charged, then the control program restores the predetermined access control class originally recorded in the memory.

11. A mobile station apparatus in a communication system, the communication system comprising a plurality of base stations for providing mobile communication service within a covered communication area, the mobile station apparatus comprising:
 a memory for recording a first access control class and a second access control class, the amount of available base stations corresponding to the first access control class being less than the amount of available base stations corresponding to the second access control class;
 a battery for providing electrical power to the mobile station apparatus; and
 a power detector for detecting the current power of the battery, when the power detector detects that the power provided by the battery is lower than a predetermined low power watermark, the power detector issuing a trigger signal;
wherein, when the mobile station apparatus does not receive the trigger signal, the mobile station apparatus uses the first access control class in the communication system, so that the mobile station apparatus is allowed to conduct the mobile communication service by merely camping on fewer base stations assigned by the first access control class; and
wherein, when the mobile station apparatus receives the trigger signal, the mobile station apparatus uses the second access control class in the communication system, so that the mobile station apparatus is allowed to conduct the mobile communication service by camping on more base stations assigned by the second access control class.

12. The mobile station apparatus of claim 11, wherein the mobile station apparatus further comprises a control program, which is able to generate a location information representing the current location of the mobile station apparatus, when the control program receives the trigger signal issued by the power detector, the control program sends out an alert message and the location information to the communication system and requests for changing the access control class of the mobile station apparatus; and when the mobile station apparatus receives a change confirmation message replied from the communication system, the mobile station apparatus is able to select other base stations in the communication area to conduct the mobile communication service through a base station select/re-select procedure.

13. The mobile station apparatus of claim 12, wherein the base station select/re-select procedure transmits the location information of the current location of the mobile station apparatus and the corresponded RSSI received from the base stations to the communication system, and then the communication system finds out the most suitable base station according to the location information and the RSSIs, so as to minimize the consumed electrical power when the mobile station apparatus conducts the mobile communication service through the found base station.

14. A method for a mobile station apparatus in a communication system for changing access control class, the communication system comprising a plurality of base stations for providing mobile communication service within a covered communication area, the mobile station apparatus also comprising a control program, a memory, and a battery; the memory being used for recording a predetermined access control class, so as to determine, under a normal condition, which base stations in the communication area the mobile station apparatus is allowed to camp on for conducting the mobile communication service, and the battery being used for providing electrical power to the mobile station apparatus, the method comprising:
 detecting the current power of the battery, and when that the power provided by the battery is lower than a predetermined low power watermark is detected, then issuing a trigger signal; and
 when receiving the trigger signal, the control program overwrites the predetermined access control class recorded in the memory, so that the mobile station apparatus is allowed to conduct the mobile communication service through other base stations in the communication area.

15. The method of claim 14, wherein the predetermined access control class recorded in the memory permits the mobile station apparatus, under the normal condition, only to conduct the mobile communication service through a predetermined limited number of, not all, base stations in the communication area.

16. The method of claim 14, wherein the control program further generates a location information representing the current location of the mobile station apparatus, and when the control program receives the trigger signal issued by the power detector, the control program sends out an alert message and the location information to the communication system and requests for changing the access control class of the mobile station apparatus; and wherein when the mobile station apparatus receives a change confirmation message replied from the communication system, the control program upgrades the access control class of the mobile station apparatus, so as to enable the mobile station apparatus to select other base stations in the communication area to conduct the mobile communication service through a base station select/re-select procedure.

17. The method of claim 16, wherein the base station select/re-select procedure transmits the location information of the current location of the mobile station apparatus and the corresponded RSSI received from the base stations to the communication system, and then the communication system finds out the most suitable base station according to the location information and the RSSIs, so as to minimize the consumed electrical power when the mobile station apparatus conducts the mobile communication service through the found base station.

18. A method for a mobile station apparatus in a communication system for changing access control class, the communication system comprising a plurality of base stations for providing mobile communication service within a covered communication area, the mobile station apparatus also comprising a memory and a battery for providing electrical power to the mobile station apparatus, the method comprising:
 recording a first access control class and a second control class in the communication area in the memory, wherein the amount of available base stations corresponding to the first access control class is less than the amount of available base stations corresponding to the second access control class;

detecting the current power of the battery, and when that the power provided by the battery is lower than a predetermined low power watermark is detected, then issuing a trigger signal;

when the trigger signal is not received, the mobile station apparatus using the first access control class in the communication system, so that the mobile station apparatus is allowed to conduct the mobile communication service by merely camping on fewer base stations assigned by the first access control class; and when the trigger signal is received, the mobile station apparatus using the second access control class in the communication system, so that the mobile station apparatus is allowed to conduct the mobile communication service by camping on more base stations assigned by the second access control class.

19. The method of claim 18, wherein the mobile station apparatus further comprises a control program, which is able to generate a location information representing the current location of the mobile station apparatus, when the control program receives the trigger signal issued by the power detector, the control program sends out an alert message and the location information to the communication system and requests for changing the access control class of the mobile station apparatus; and when the mobile station apparatus receives a change confirmation message replied from the communication system, the mobile station apparatus is able to select other base stations in the communication area to conduct the mobile communication service through a base station select/re-select procedure.

20. The method of claim 19, wherein the base station select/re-select procedure transmits the location information of the current location of the mobile station apparatus and the corresponded RSSI received from the base stations to the communication system, and then the communication system finds out the most suitable base station according to the location information and the RSSIs, so as to minimize the consumed electrical power when the mobile station apparatus conducts the mobile communication service through the found base station.

* * * * *